United States Patent [19]

Ponticello et al.

[11] Patent Number: 4,689,359
[45] Date of Patent: Aug. 25, 1987

[54] COMPOSITION FORMED FROM GELATIN AND POLYMER OF VINYL MONOMER HAVING A PRIMARY AMINE ADDITION SALT GROUP

[75] Inventors: Ignazio S. Ponticello; Edward P. Otocka, both of Pittsford, N.Y.

[73] Assignee: Eastman Kodak Company, Rochester, N.Y.

[21] Appl. No.: 768,386

[22] Filed: Aug. 22, 1985

[51] Int. Cl.⁴ ............................................. C08L 89/00
[52] U.S. Cl. ........................................ 524/23; 524/24
[58] Field of Search ............... 526/292.2, 310; 524/23, 524/24

[56] References Cited

U.S. PATENT DOCUMENTS 2,627,088  2/1953  Alles et al. .
2,779,684  1/1957  Alles .
2,811,494 10/1957  Smith et al. ........................... 524/24
3,143,421  8/1964  Nadeau et al. .
3,201,249  8/1965  Pierce et al. .
3,321,451  5/1967  Gander ............................. 526/292.2
3,341,505  9/1967  Gander ............................. 526/292.2
3,400,103  9/1968  Samour et al. ....................... 526/310

FOREIGN PATENT DOCUMENTS 743376  1/1956  United Kingdom ................. 524/24

Primary Examiner—Peter F. Kulkosky
Attorney, Agent, or Firm—John R. Everett

[57]                ABSTRACT

A polymer composition comprising:
  (a) from 1 to 60 weight percent of recurring units derived from a polymerized vinyl monomer having a primary amine addition salt component or an aminostyrene addition salt component;
  (b) from 0 to 50 weight percent of recurring units derived from a nonionic polymerized hydrophilic vinyl monomer; and
  (c) from 20 to 98 weight percent of recurring units derived from a polymerized hydrophobic nonionic vinyl monomer is disclosed for use in coating compositions for polyester supports.

7 Claims, No Drawings

COMPOSITION FORMED FROM GELATIN AND POLYMER OF VINYL MONOMER HAVING A PRIMARY AMINE ADDITION SALT GROUP

FIELD OF THE INVENTION

This invention relates to a novel group of polymers and their use in coating composition polyester supports, particularly in photographic elements.

BACKGROUND OF THE INVENTION

Polyester film supports are well known. Their use as supports in photographic elements is an example. For use in the latter elements, the polyester film support must be coated with layers, referred to sometimes as a subbing layer, to promote adhesion between the polyester film support and other emulsion layers in the photographic element, such as gelatin silver halide layers.

A commercial process used for promoting adhesion polyester film supports involves extrusion and biaxial orientation of, for example, a poly(ethyleneterephthlate) film support according to well known techniques disclosed, for example in U.S. Pat. Nos. 2,779,684 and 2,627,088. The resulting polyester film support is then discharge-treated. This discharge treatment can be by, for example, plasma or corona discharge. A coating composition is then applied to the support to provide adhesion between the support and subsequently coated layers. Emulsion layers, such as gelatin silver halide layers are then coated over the adhesion-promoting layer.

Frequently used polymer materials, such as poly(-methyl acrylate-co-vinylidene chloride-coitaconic acid) and poly(acrylonitrile-co-vinylidene chloride-co-acrylic acid) disclosed in U.S. Pat. Nos. 3,201,249 and 3,143,421 respectively, do not provide coating compositions which are sufficiently adhesive to polyester film supports when used in the above-described commercial process. Coatings which provide better adhesion are desired

SUMMARY OF THE INVENTION

The present invention relates to the discovery of a new group of polymers which provide improved adhesion of coating compositions comprising gelatin to the discharge-treated polyester film supports. The polymers of this invention comprise (a) from 1 to 60 weight percent of recurring units derived from a polymerized vinyl monomer having a primary amine addition salt component or an aminostyrene addition salt component;

(b) from 0 to 50 weight percent of recurring units derived from a nonionic polymerized hydrophilic vinyl monomer; and (c) from 20 to 98 weight percent of recurring units derived from a polymerized hydrophobic nonionic vinyl monomer. The disclosed are particularly useful as coating compositions for polyester supports.

Less than 1 weight percent of component (a) causes the polymer to loose water stability and ability to crosslink. More than 60 weight percent of component (a) causes the polymer to be too hydrophilic and loose wet adhesion. Component (c) is added to assist in adjusting the balance of hydrophilic and hydrophobic properties of the polymer.

The polymers are used to make polymer and polymer/gelatin coating compositions wherein the polymer/gelatin ratio of polymer and gelatin coating is 95:5 to 60:40.

From the coating compositions, adhesion-promoting layers are formed, for example, on discharge-treated polyester film supports used in photographic elements.

PREFERRED EMBODIMENTS OF THE INVENTION

In a preferred embodiment, the polymers of this comprise a polymerized vinyl monomer containing a primary amine addition salt component which has the structure

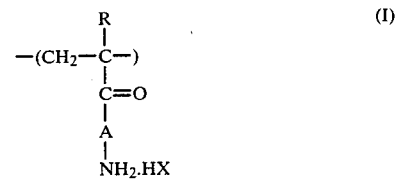

and/or a polymerized vinyl monomer containing an aminostyrene component which has the structure

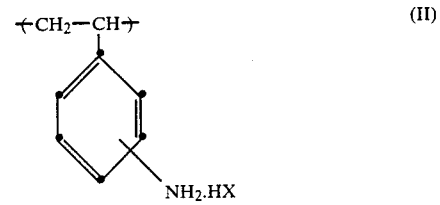

wherein
R is hydrogen or methyl;
A is either $-OR^1-$ or

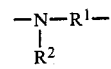

$R^1$ is a straight or branched chain alkylene group of 1 to about 6 carbon atoms;
$R^2$ is hydrogen or a straight or branched chain alkyl or cycloalkyl group of 1 to 10 carbon atoms: and
X is an acid anion.

DETAILS OF THE INVENTION

The polymers of this invention may be prepared by latex polymerization, or solution polymerization followed by dispersion of the polymer in water by addition of the organic solution to water containing a surfactant. Polymers prepared in both ways are effective in improving adhesion between polyester supports and subsequently coated gelatin layers including gelatin containing silver halide layers. Both latex polymerization and solution polymerization are well known. See W. R. Sorenson and T. N. Campbell, "Preparative Methods of Polymer Chemistry", 2nd Ed., J. Wiley and Sons, New York, N.Y. (1968) and M. R. Stevens, "Polymer Chemistry, an Introduction", Addison-Wesley Publishing Co., Inc., London (1975).

In latex polymerization the selected monomers are colloidally emulsified in an aqueous medium that usually contains a cationic, nonionic, or zwiterionic surfactant and a polymerization catalyst such as 2,2'-azobis(2-amidinopropane)hydrochloride. The resulting colloidal emulsion is then subjected to conditions conducive to polymerization of the monomeric constituents to produce an aqueous colloidal dispersion commonly called a latex.

Solution polymerization generally involves dissolving the selected monomers in an organic solvent containing a polymerization initiator such as 4,4'-azobis(4-cyanovaleric acid), 2,2'-azobis(2-methylpropionitrile) and 2,2'-azobis(2-amidinopropane)hydrochloride. The solution is maintained under a nitrogen atmosphere and heated at about 60°. The resulting polymer is then dispersed in water at about 1–5 percent solids. The polymer is then purified by diafiltration.

Useful starting monomers having the primary amine addition salt component include 2-aminoethyl methacrylate hydrochloride, N-(3-aminopropyl)methacrylamide hydrochloride and p-aminostyrene hydrochloride. Addition salts of other acids can also be used, e.g., hydrobromic, phosphoric, sulfuric, and benzoic acids.

Useful hydrophilic nonionic vinyl monomers include 1-vinylimidazole, 2-methyl-1-vinylimidazole, 2-hydroxyethyl acrylate, 2-hydroxyethyl methacrylate, acrylamide and 2-acetoxyethyl methacrylate.

Useful hydrophobic vinyl monomers include alkyl acrylates such as butyl acrylate, N-butyl methacrylate, ethyl methacrylate, styrene and the like.

The following examples are presented to demonstrate the improved adhesion of polymer subbing material on discharge-treated polyester supports resulting from the use of coating compositions comprising the polymers of this invention.

EXAMPLE 1

Solution Polymerization of Poly(n-butyl acrylate-co-2-aminoethyl methacrylate hydrochloride-co-2-hydroxyethyl methacrylate) (Weight Ratio 50/15/35)

A mixture of n-butyl acrylate (200.0 gm, 1.56 moles), 2-aminoethyl methacrylate hydrochloride (60.0 gm, 0.35 moles), 2-hydroxyethyl methacrylate (140.0 gm, 1.08 moles), and 4,4'-azobis(4-cyanovaleric acid) (4.0 gm, 75% purity) in N,N-diemethylformamide (1350 ml) was maintained under a nitrogen atmosphere and heated at 70° C. in a constant temperature water bath for 20 hours. The resulting polymer solution was then slowly added over 3 hours to water (2 l) and Zonyl FSN, a fluorinated surfactant sold by du Pont (30.0 gm of a 40% solution in H$_2$O/isopropyl alcohol) in a constant temperature water bath at 70° C. The polymer dispersion was purified by diafiltration (10 passes) with a 20,000 molecular weight cut-off polysulfone membrane to give a solution of 5.3% solids (392 gm). Yield 98%. The polymer had a 2-aminoethyl methacrylate hydrochloride content of 14.2%. Theoretical was 15.0 weight percent. Tg was 55° C.

EXAMPLE 2

Latex Polymerization of Pol(n-butyl acrylate-co-styrene-co-2-aminoethyl methacrylate hydrochloride) (Weight Ratio 60/30/10)

A mixture of n-butyl acrylate (270 gm, 2.1 moles), styrene (135 gm, 1.3 moles), 2-aminoethyl methacrylate hydrochloride (45.0 gm, 0.27 moles), initiator (as below, 4.5 gm), and Cyastat SP surfactant (32.0 gm, 35% solution) in water (2250 ml) was slowly added to water (900 ml), containing 2,2'-azobis(2-amidinopropane)hydrochloride initiator (1.5 gm) and surfactant Cyastat SP (6.6 gm of a 35% solution, American Cyanamide) over 2 hours at 70° C. under a nitrogen atmosphere. The resulting mixture was then heated for 4 additional hours at 70° C. and finally water (2 l) was added at 70° C. with stirring. The polymer solution was purified by diafiltration (10 passes) with a 20,000 molecular weight cut-off polysulfone membrane to give a solution containing 15.6% solids (388 gm). Yield 86%. The polymer has a 2-aminoethyl methacrylate hydrochloride content of 3.4%. This polymer contains no polymerized hydrophilic vinyl monomers. Theoretical was 10.0 weight percent of amine monomer. Tg at 6 and 122° C.

The polymers of Table I, infra, were prepared in the same manner as above. Both latex polymer Tg's and solution polymer Tg's are given where available.

TABLE I

| Polymer No. | Polymer | Tg °C. |
|---|---|---|
| 1 | poly(n-butyl acrylate-co-2-aminoethyl methacrylate hydrochloride-co-2-hydroxyethyl methacrylate) (60/15/25) | |
| 2 | poly(methyl acrylate-co-2-aminoethyl methacrylate hydrochloride-co-2-hydroxyethyl methacrylate) (50/15/35) | Latex + 90 |
| 3 | poly(ethyl acrylate-co-2-aminoethyl methacrylate hydrochloride-co-2-hydroxyethyl methacrylate) (60/15/25) | Latex-12; 108 Solution 50 |
| 4 | poly(ethyl acrylate-co-2-aminoethyl methacrylate hydrochloride-co-2-hydroxyethyl methacrylate) (50/15/35) | Latex-16; 105 Solution 70 |
| 5 | poly(n-butyl acrylate-co-2-aminoethyl methacrylate hydrochloride-co-2-hydroxyethyl methacrylate) (50/30/20) | |
| 6 | poly[n-butyl methacrylate-co-N—(3-aminopropyl)methacrylamide hydrochloride-co-2-hydroxyethyl methacrylate](50/30/20) | Solution 45; 116 |
| 7 | poly[n-butyl acrylate-co-N—(3-aminopropyl)methacrylamide hydrochloride-co-2-hydroxyethyl methacrylate](50/15/35) | Latex-22; 133 Solution 50 |
| 8 | poly(n-butyl acrylate-co-2-aminoethyl methacrylate hydrochloride-co-2-hydroxyethyl methacrylate) (20/60/20) | |
| 9 | poly(n-butyl acrylate-co-2-aminoethyl methacrylate hydrochloride-co-2-hydroxethyl methacrylate) (50/10/40) | Latex-20; 110 |
| 10 | poly(n-butyl acrylate-co-2-aminoethyl methacrylate hydrochloride-co-2-hydroxyethyl methacrylate) (50/5/45) | Latex-16; 104 Solution-23; 45 |
| 11 | poly(n-butyl acrylate-co-2-aminoethyl methacrylate hydrochloride-co-2-hydroxyethyl methacrylate) (50/15/35) | |
| 12 | poly(n-butyl acrylate-co-styrene-co-2-aminoethyl methacrylate hydrochloride) (60/30/10) | |

The polymers of this invention are formulated into aqueous solutions for coating within a range of polymer to gelatin ratios of 95:5 to 60:40 with surfactant in amounts of 1–5% and hardener in amounts of 0–3% of solids. Both acid and lime-treated gelatins are useful.

Useful surfactants include Zonyl TM FSN (a fluorinated surfactant sold by du Pont); Lodyne TM S-100 (sold by Ciba-Geigy Company); and Surfactan TM 10G (sold by Olin Chemical Company). Useful hardeners include bis(vinylsulfonylmethyl)ether and bis(vinylsulfonyl)methane.

The solids content in the coating composition is typically 0.8–3.0% in distilled water.

The method of making the coating composition is not critical to the performance of the coating. The general method is as follows: The dispersed polymer and surfactant at about 5–10% solids, are warmed with stirring to 40° C. The gelatin is added as a 40° C. aqueous solution at about 2% solids with stirring. Finally, the hardener is added, with stirring as a 1% aqueous solution. Adjustments to achieve the final desired solids content for a particular coating are made by addition of distilled water.

Suitable polyester film supports are highly polymeric linear polyesters of bifunctional aromatic dicarboxylic acids and bifunctional polyhydroxy organic compounds. Generally, they are polyesters derived from terephthalic dicarboxylic acids and alkylene diols. These are well known and can be prepared from any of the polyester compositions described, for example, in Nadeau U.S. Pat. No. 2,943,937 or in Alles et al, U.S. Pat. No. 2,627,088. An especially useful polyester film support is that formed from poly(ethylene terephthate).

Polyester film supports are formed from molten polyesters. The polyester is prepared in a molten form, extruded and biaxially oriented as described in, for example, U.S. Pat. No. 2,627,088. Biaxial orientation refers to the technique of stretching the extruded polyester film both horizontally and linearly. The extruded biaxially oriented polyester film is then subjected to a discharge treatment. A wide variety of discharge methods are employed to treat polymer film surfaces to improve the wettability and adhesion of coatings applied thereon. The amount or extent of treatment is conventionally measured by the contact angles exhibited by selected liquids applied to the polymer surface. Examples of such methods are found in a number of references, such as "Surface and Colloid Science", Vol. 2, E. Matijevic, Editor (John Wiley, 1969).

For application of the coating composition comprising the polymers of this invention, sufficient treatment should be applied so that the advancing contact angle of distilled water is reduced to 60°±5°. This level of treatment is readily achieved by a number of laboratory or production scale treatments, equipment, and methods. In the following examples, the biaxilly oriented polyester supports were discharge-treated with a corona.

The coating solutions are applied by hopper or pan coating methods to give dry coverages of 10–50 mg/ft$^2$ (107–538 mg/m$^2$). The coatings are applied directly biaxially oriented polyester support pretreated by corona discharge to a 60° advancing contact angle and dried by conventional means at temperatures up to 128° C. The adhesion performance of the coated layer display minimum sensitivity to coating and drying details within the range of normal practice known in the art.

A gelatino silver halide emulsion layer is then coated onto the subbing layer. Other radiation-sensitive layers may also be used in addition to the light-sensitive silver salts (chloride, bromide, iodide, or mixtures thereof). The layers may contain gum arabic or other selected natural or synthetic polymers.

Coating compositions, prepared and coated as layers in the aforementioned manner and overcoated as described to form photographic elements were evaluated for adhesion under three conditions relating to their fitness for use: dry, unprocessed, wet during processing and dried after processing.

The dry tests were performed by scribing a cross-hatched area on the film with a razor blade. Adhesive tape (#610 from 3M Company) was then applied to the crosshatched area, and rapidly peeled off in an effort to remove the light-sensitive layers. Results are evaluated as a percentage of the cross-hatched area removed.

| 0% | excellent |
| 5% | fair |
| 100% | poor |

For the wet condition, film is scribed with a sharp stylus to remove a 1–2 mm strip of the light-sensitive layer. The wet surface is rubbed across this strip in an effort to induce further peeling. Results are evaluated as the distance in mm of peeling after ten rubs.

| 0 | excellent |
| 1 | fair |
| 2–7 | poor |

Control

A control photographic element was prepared which was identical to the examples of the invention except the coating composition applied to the biaxially oriented and corona discharged-treated polyester support comprised the prior art polymer disclosed in Example 1 of U.S. Pat. No. 3,143,421.

EXAMPLE 3

A. A coating composition was prepared comprising poly(n-butyl acrylate-co-2-amino ethyl methacrylate hydrochloride-co-2-hydroxy ethyl methacrylate) (weight ratio 50/15/35), Lodyne TM S-100 surfactant, bis(vinylsulfonylmethyl)ether hardener and gelatin. The polymer/gelatin/hardener/surfactant composition was 76.6/19.2/.4/3.8 and the solution solids were 1.0%. The composition was coated and dried to coverages shown in Table II.

B. A coating composition similar to Example 3A except that the polymer/gelatin/hardener/surfactant ratio was 81.4/14.4/.4/3.8.

TABLE II

| Examples | Coverage (mg/m$^2$) | Dry Adhesion Unprocessed | Wet Adhesion | Dry Adhesion Post Processed |
|---|---|---|---|---|
| Control | 215.3 | 10 | 2 | 100 |
| 3A | 107.6 | 0 | 1 | 30 |
| 3A | 215.3 | 0 | 0 | 0 |
| 3B | 107.6 | 0 | 1 | 20 |
| 3B | 215.3 | 0 | 0 | 0 |
| 3B | 322.9 | 0 | 0 | 0 |

This table demonstrates that the polymers of this invention provide coated layers which are superior to the prior art polymers used in the control. Within the range of this example, the gelatin content has a limited effect on performance.

EXAMPLE 4

Photographic elements 4A-4L were prepared as described for Example 3B with the exceptions that 1% bis(vinylsulfonylmethyl)ether was used instead of 0.5%. Also, a different cationic or nonionic surfactant was used in each example. All subbing layer coverages were 15-6 mg/ft² (0.161-0.172 g/m²).

TABLE III

| Example | Adhesion Testing | | |
|---|---|---|---|
| | Dry Adhesion Unprocessed | Wet Adhesion | Dry Adhesion Post Processed |
| 4A | 0 | 0 | 0 |
| 4B | 0 | 0 | 0-5 |
| 4C | 0 | 0 | 0-5 |
| 4D | 0 | 0 | 0-5 |
| 4E | 0 | 0 | 0-5 |
| 4F | 0 | 0-1 | 0-5 |
| 4G | 0 | 0 | 0-5 |
| 4H | 0 | 0 | 0-5 |
| 4I | 0 | 0 | 0-5 |
| 4J | 0 | 0 | 0-5 |
| 4K | 0 | 0 | 0-5 |
| 4L | 0 | 0-1 | 0-5 |

This data shows that, in general, adhesion is relatively insensitive to cationic, zwiterionic and nonionic surfactants over a range of useful polymers.

EXAMPLE 5

Additional photographic elements 5A and 5B were prepared as described in Example 3 except that the coating compositions used were as follows.

A. The polymer was poly(ethyl acrylate-co-2-aminoethyl methacrylate hydrochloride-co-2-hydroxyethyl methacrylate) (weight ratio 60/15/25). The surfactant employed was Olin Surfactant TM 10G. The ratio of polymer/gelatin/bis(vinylsulfonylmethyl)ether/surfactant was 81.4/14.4/.4/3.8.

B. The polymer was poly(n-butyl acrylate-co-styrene-co-2-aminoethyl methacrylate hydrochloride) (weight ratio 60/30/10). The surfactant employed was Olin Surfactant TM 10G. The ratio of polymer/gelatin/BVSME/surfactant was 80.2/14.2/.9/4.7.

The test results are provided in Table IV.

TABLE IV

| Example | Coverage (mg/m²) | Adhesion Testing Results | | |
|---|---|---|---|---|
| | | Dry Adhesion Unprocessed | Wet Adhesion | Dry Adhesion Post Processed |
| 5A | 215.3 | 0 | 0 | 0-5 |
| 5B | 215.3 | 0 | 0 | 0 |

The coating composition of this example provided excellent adhesion in all three adhesion categories.

EXAMPLE 6

Two photographic elements (6A and 6B) were prepared as described in Example 3A for evaluation with the following exceptions.

A. The surfactant used was Cyastat TM SP and the ratio of polymer/gelatin/BVSME/surfactant was 82.1/14.5/0.5/2.9.

B. Same as 6A, except that no hardener was used. The ratio of polymer/gelatin/bis(vinylsulfonylmethyl)ether/surfactant was 82.5/14.5/0/2.9. The test results for each adhesion test (dry unprocessed, wet, dry post process) are presented in Table V.

TABLE V

| Example | Coverage (g/m²) | Adhesion Testing Results | | |
|---|---|---|---|---|
| | | Dry Adhesion Unprocessed | Wet Adhesion | Dry Adhesion Post Processed |
| 6A | 0.215 | 0 | 0 | 0 |

TABLE V-continued

| Example | Coverage (g/m²) | Adhesion Testing Results | | |
|---|---|---|---|---|
| | | Dry Adhesion Unprocessed | Wet Adhesion | Dry Adhesion Post Processed |
| 6B | 0.215 | 0 | 0 | 0 |

The coating compositions also provide excellent dry adhesion.

The invention has been described in detail with particular reference to preferred embodiments thereof, but it will be understood that variations and modifications can be effected within the spirit and scope of the invention.

We claim:

1. An aqueous polymer and gelatin coating composition wherein the polymer to gelatin ratio is in the range of 95:5 to 60:40 and the polymer comprises
   (a) from 1 to 60 weight percent of recurring units derived from a polymerized vinyl monomer having a primary amine addition salt component or aminostyrene addition salt component;
   (b) from 0 to 50 weight percent of recurring units derived from a polymerized hydrophilic vinyl monomer; and
   (c) from 20 to 98 weight percent of recurring units derived from a polymerized hydrophobic nonionic vinyl monomer.

2. The coating composition of claim 1 wherein the polymerized vinyl monomer having the primary amine addition salt component has the structure $$-(CH_2-\underset{\underset{\underset{NH_2 \cdot HX}{|}}{\underset{|}{A}}}{\overset{\overset{R}{|}}{\underset{|}{C}}}-) \quad (I)$$

with C=O between C and A and the polymerized vinyl monomer having the aminostyrene addition salt component has the structure $$+CH_2-CH+ \quad (II)$$
(phenyl ring with NH_2 \cdot HX)

wherein
R is hydrogen or methyl;
A is either —OR¹— or $$-N-R^1-;\\ \quad |\\ \quad R^2$$

R¹ is a straight or branched chain alkylene group of 1 to about 6 carbon atoms;
R² is hydrogen or a straight or branched chain alkyl or cycloalkyl group of 1 to 10 carbon atoms: and
X is an anion.

3. The coating composition of claim 2 wherein the polymerized vinyl monomer having the primary amine addition salt component has the structure

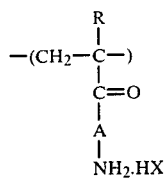

A is either —OR$^1$— or

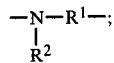

and

X is an acid anion.

4. The coating composition of claim 2 or 3 wherein the dispersed polymer comprises
 (a) from 1 to .60 weight percent of recurring units derived from the group consisting of a polymerized aminoethyl methacrylate hydrochloride and a polymerized aminopropylmethacrylamide;
 (b) from 0 to 50 weight percent of a polymerized hydroxyethyl methacrylate; and
 (c) 20 to 98 weight percent of a polymerized monomer selected from the group consisting of butyl acrylate, butyl methacrylate, methyl acrylate, ethyl acrylate and styrene.

5. The coating composition of claim 3 wherein the dispersed polymer is selected from the group consisting of poly(n-butyl acrylate-co-2-aminoethyl methacrylate hydrochloride-co-2-hydroxyethyl methacrylate);

poly(methyl acrylate-co-2-aminoethyl methacrylate hydrochloride-co-2-hydroxyethyl methacrylate);

poly(ethyl acrylate-co-2-aminoethyl methacrylate hydrochloride-co-2-hydroxyethyl methacrylate);

poly[n-butyl methacrylate-co-N-(3-aminoproyl)methacrylamide hydrochloride-co-2-hydroxyethyl methacrylate];

poly[n-butyl acrylate-co-N-(3-aminopropyl)methacrylamide hydrochloride-co-2-hydroxyethyl methacrylate]; and poly(n-butyl acrylate-co-styrene-co-2-aminoethyl methacrylate hydrochloride).

6. The composition of claim 5 wherein the dispersed polymer is selected from the group consisting of poly(n-butyl acrylate-co-2-aminoethyl methacrylate hydrochloride-co-2-hydroxyethyl methacrylate) (60/15/25);

poly(methyl acrylate-co-2-aminoethyl methacrylate hydrochloride-co-2-hydroxyethyl methacrylate) (50/15/35);

poly(ethyl acrylate-co-2-aminoethyl methacrylate hydrochloride-co-2-hydroxyethyl methacrylate) (60/15/25);

poly(ethyl acrylate-co-2-aminoethyl methacrylate hyorochloride-co-2-hydroxyethyl methacrylate) 50/15/35);

poly(n-butyl acrylate-co-2-aminoethyl methacrylate hydrochloride-co-2-hydroxyethyl methacrylate) 50/30/20);

poly[n-butyl methacrylate-co-N-(3-aminopropyl)methacrylamide hydrochloride-co-2-hydroxyethyl methacrylate] (50/30/20);

poly[n-butyl acrylate-co-N-(3-aminopropyl)methacrylamide hydrochloride-co-2-hydroxyethyl methacrylate] (50/15/35);

poly(n-butyl acrylate-co-2-aminoethyl methacrylate hydrochloride-co-2-hydroxyethyl methacrylate) (20/60/20);

poly(n-butyl acrylate-co-2-aminoethyl methacrylate hydrochloride-co-2-hydroxyethyl methacrylate) (50/10/40);

poly(n-butyl acrylate-co-2-aminoethyl methacrylate hydrochloride-co-2-hydroxyethyl methacrylate) (50/5/45);

poly(n-butyl acrylate-co-2-aminoethyl methacrylate hydrochloride-co-2-hydroxyethyl methacrylate) (50/15/35); and poly(butyl acrylate-co-styrene-co-2-aminoethyl methacrylate hydrochloride) (60/30/10).

7. The composition of claim 1, 2, or 3 also comprising from 0.005 to 0.0075 weight percent of a hardener.

* * * * *